Oct. 19, 1943. P. VAN SITTERT 2,331,874
POWER-DRIVEN PORTABLE TOOL
Filed May 24, 1941 2 Sheets-Sheet 2
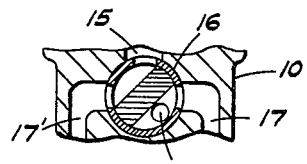
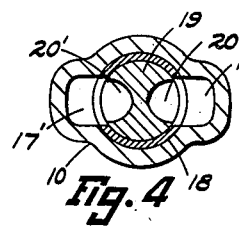
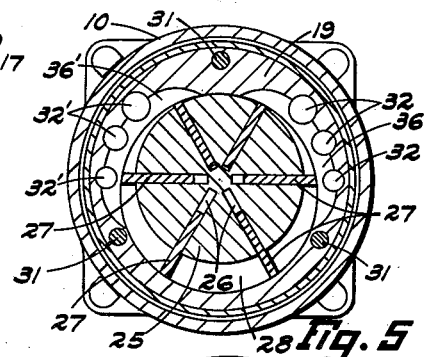
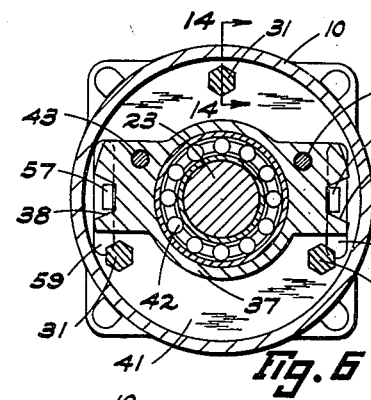
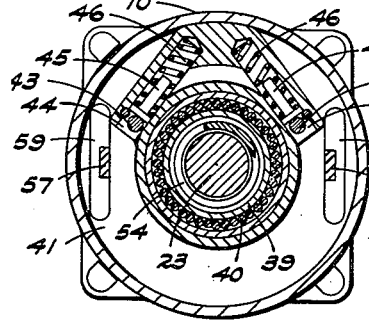
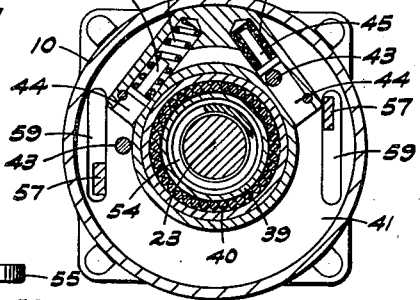
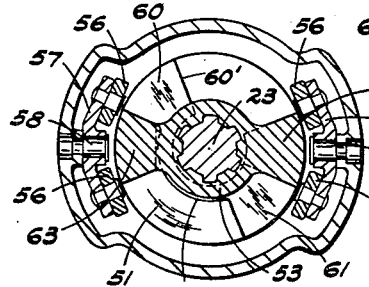
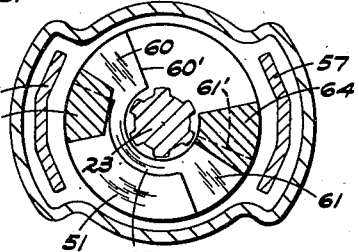
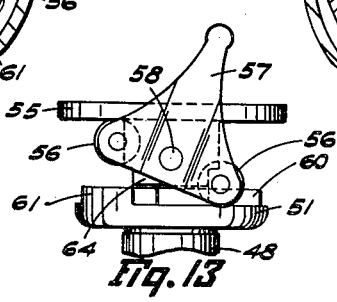
INVENTOR
PAUL VAN SITTERT
BY
*Johns C. Kemper*
ATTORNEY Patented Oct. 19, 1943

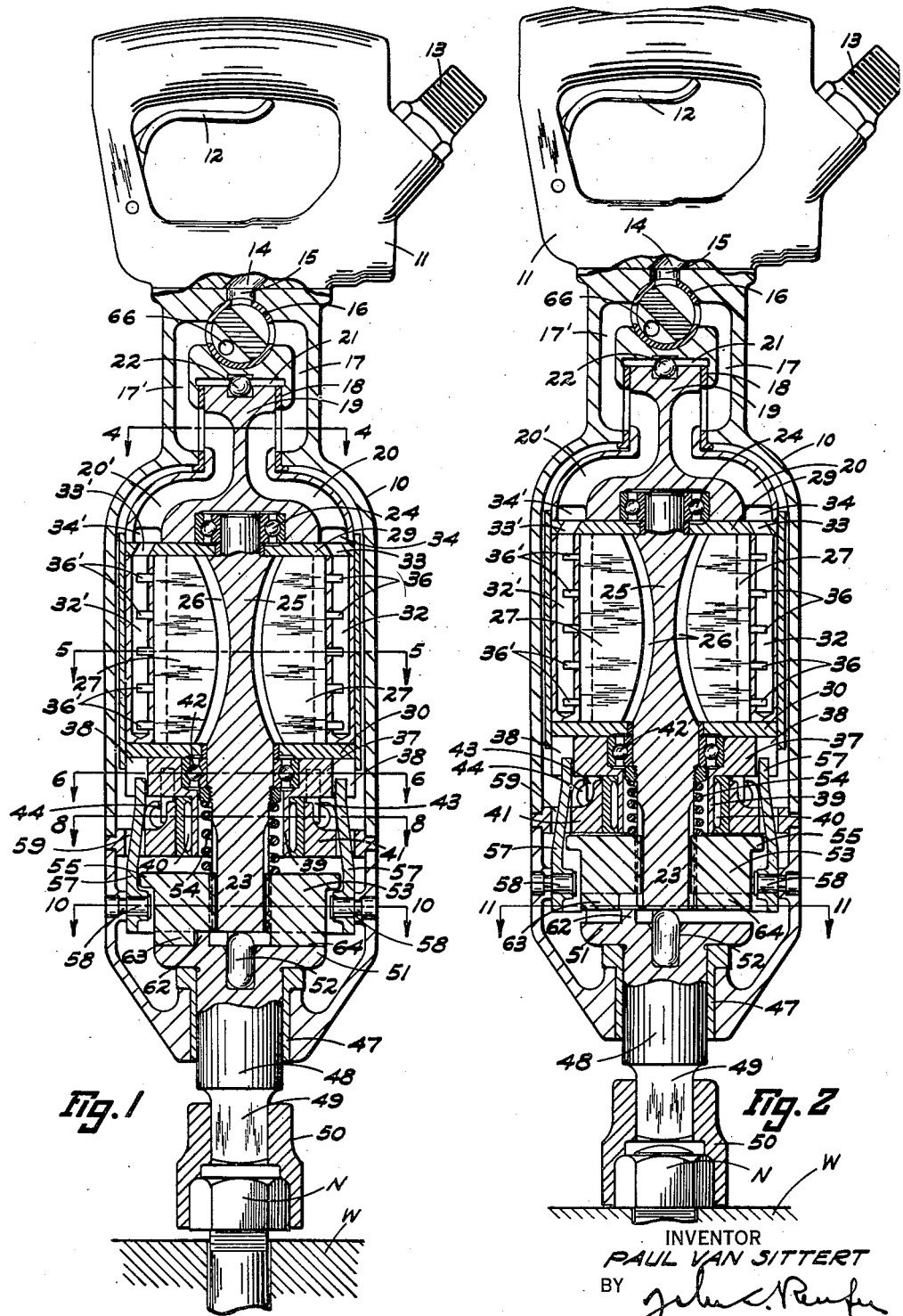

2,331,874

UNITED STATES PATENT OFFICE 2,331,874

POWER-DRIVEN PORTABLE TOOL

Paul Van Sittert, Shaker Heights, Ohio, assignor to The Cleveland Pneumatic Tool Company, Cleveland, Ohio, a corporation of Ohio Application May 24, 1941, Serial No. 395,053

6 Claims. (Cl. 192—30.5)

This invention relates to improvements in power-driven portable tools, and has reference particularly to air tools used for driving rotatable fastenings, as for example nuts, studs, screws and the like. The illustrated embodiment is a power-driven socket wrench.

One of the objects of the invention is the provision of means for imparting to the driven head of the tool a series of shocks or hammer blows after the nut or other fastening being driven encounters a substantial resistance to movement, whereby a tool of moderate power is enabled to impart comparatively heavy impacts in rapid succession to accomplish a tight setting of the fastening, which would otherwise require the use of a more powerful tool.

Another object is the provision of a reversible tool of the character described.

A further object is the provision of means for enabling the rotor to turn without load through a considerable angle, preferably a complete revolution after one blow is delivered before the next succeeding shock is encountered, so that opportunity is afforded for a considerable acceleration of the rotor between impacts.

Still another object is the provision of a mechanism by virtue of which the reaction upon an oscillatably supported stator may be utilized for momentarily disengaging the clutch.

Other objects and features of the novelty will appear as I proceed with the description of that embodiment of the invention which, for the purposes of the present application, I have illustrated in the accompanying drawings, in which:

Fig. 1 is a view principally in central longitudinal section of a portable power wrench embodying the invention, the clutch being shown in engagement.

Fig. 2 is a similar view with the clutch disengaged.

Fig. 3 is a fragmental sectional view of the reversing valve shown in a different operative position from that of Figs. 1 and 2.

Figs. 4, 5 and 6 are cross-sectional views taken substantially on the lines 4—4, 5—5 and 6—6 of Fig. 1.

Fig. 7 is a view similar to Fig. 6, showing the stator displaced from its normal position.

Fig. 8 is a cross-sectional view taken substantially on the line 8—8 of Fig. 1.

Fig. 9 is a view similar to Fig. 8, showing the parts in the position they occupy when the stator is displaced by back pressure.

Fig. 10 is a cross-sectional view taken substantially on the line 10—10 of Fig. 1.

Fig. 11 is a cross-sectional view taken on the line 11—11 of Fig. 2.

Fig. 12 is a fragmental, elevational view, of a somewhat diagrammatic character, showing the restraining lever in normal position and the clutch engaged.

Fig. 13 is a view similar to Fig. 12, showing the restraining lever moved to clutch disengaging position, and Fig. 14 is a detail, sectional view taken substantially on the line 14—14 of Fig. 6.

In the drawings the casing or body of a rotary tool is illustrated at 10. At its upper end a handle member 11 is secured to the body member, this handle member embodying a convenient grip for one hand of the operator and carrying a lever 12 for the manipulation of a throttle, not shown, which is located in the lower portion of the handle member. A flexible conductor for compressed air may be attached to the handle at 13, and the throttled supply is admitted to the body of the tool through a passage 14 in the handle member.

Passage 14 communicates with a short passage 15 in the body leading to one of the ports in a reversing valve 16. With this valve in the position of Figs. 1 and 2 the air then flows into an intake passage 17, after which it passes through a port in a sleeve 18 which functions partly as a bearing for the upper end of the stator 19, and thence into a continuation 20 of the inlet passage carried by the stator. The sleeve 18 and the upper end of the stator extend into a downwardly opening socket 21 in the body 10 of the tool, and an anti-friction thrust ball 22 is here interposed between the body and the stator.

The rotor of the tool comprises a shaft 23, the upper extremity of which is mounted in a ball bearing 24 carried by the stator 19. The rotor proper is an integral part 25 of this shaft and has a number of radial slots 26 therein for the reception of blades 27, the outer edges of which are held by centrifugal force in contact with an eccentric cylindrical chamber 28 in the stator, this chamber being bounded top and bottom by circular plates 29 and 30 which are tightly secured to the intermediate part of the stator by bolts 31.

In one side of the stator outside of the chamber 28 there are a plurality of longitudinally extending passages 32 which communicate at their upper ends with ports 33 extending through plate 29 in registration with inlet passage 20 through a partly circular groove 34. These passages are brought into communication with the chamber 28 by spaced horizontal slots 36 in the body of the stator. The bolts 31 extend also through reduced portions of a thick plate 37 that constitutes part of the stator, the thick portion of the plate being provided with diametrically opposite notches 38. The plate 37 has a downward cylindrical extension 39 which is mounted within a needle bearing 40 carried in a partition 41 which is rigidly connected at its periphery to the casing 10 of the tool. The lower end of the stator is thus firmly centered but is capable of slight oscillation.

The shaft 23 of the rotor is rotatably mounted somewhat above its lower end by a ball bearing 42 carried by the plate 37. The latter plate has mounted therein two depending pins 43 which are adapted to enter slotted barrels 44 in which there are plungers 45 backed by coil springs 46, these barrels being formed in the partition 41.

The bottom end of the body 10 tapers inwardly and supports a bushing 47 in which is rotatably mounted a short shaft 48 with a squared lower end 49 that may be received in a complementary opening of a socket wrench 50, while the upper end of shaft 48 is integrally formed to constitute the driven element 51 of a two-jaw clutch. A vertical roller 52 with hemispherical ends sets into a central pocket in the clutch element 51 and engages the lower extremity of shaft 23, thereby constituting a simple and effective thrust bearing. The other element 53 of the clutch is adapted to slide upon the splined lower portion of the shaft 23 and is biased downwardly, or toward clutch engaging position, by a coil spring 54.

On the upper end of the clutch element 53 there is a circular rim 55 the lower surface of which is normally in engagement or substantial engagement with a pair of rollers or wheels 56 carried upon a lever 57 that is pivoted at 58 to the tool body. Preferably there are two diametrically opposed levers 57 which are identical in construction, each carrying a pair of rollers 56. The smaller upper ends of these levers extend through slots 59 in the partition 41 and into the notches 38 of stator plate 37.

The lower element 51 of the clutch has a pair of jaws 60 and 61 connected by a land 62. It will be noted that the edge 60' of one of these jaws is spaced from the edge 61' of the other jaw by less than an angle of 180°. The upper clutch element 53 has depending jaws 63 and 64, the jaw 63 lying entirely outward radially of the land 62, while the jaw 64 extends inwardly as far as the inner edge of the land 62. In Fig. 10 the clutch is shown engaged while in Fig. 11 it is disengaged. In the latter figure the parts are in the position they occupy directly after the disengagement takes place, the upper element 53, carrying the jaws 63 and 64, being displaced upwardly far enough to clear the jaws of the element 51. The jaws 63 and 64, moving in a clockwise direction, are beginning to ride over the upper surface of jaws 60 and 61. The clutch is not free to engage, however, when the jaws of the upper element pass those of the lower element because jaw 64 then rides upon the land 62 of the lower element and the upper element can not again descend until jaw 64, moving more than 180° in the clockwise direction, has cleared jaw 60. The jaws of the two elements are then in condition to reengage when the upper element has turned through a full revolution from the point at which the disengagement occurred.

On the side of the stator opposite the passages 32, there are a plurality of passages 32', with which spaced slots 36' communicate. The spent pressure fluid is discharged into these slots 36' and thence into the passages 32', after which it passes through ports 33' into exhaust passage 20' via semicircular groove 34' through a port in sleeve 18, through exhaust passage 17', through a port in reversing valve 16 and out to atmosphere through an end hole 66.

*Operation.*—For the purpose of driving a nut such as N of Figs. 1 and 2, the socket wrench 50 is placed over the nut, as in Fig. 1, and the operator manipulates throttle lever 12 to admit pressure fluid to the tool. The rotor turns clockwise by reason of the action of the fluid on the exposed ends of the blade 27 and the spent fluid exhausts to atmosphere through the discharge passages and ports previously referred to. At this time the stator is restrained from movement in the counter-clockwise direction by the levers 57, which hold the plate 37 against rotation, these levers being yieldably held against tilting by engagement of the rim 55 with the rollers 56, the spring 54 maintaining the latter engagement. Action of the spring pressed plungers 45 carried by the partition 41 on the pins 43 depending from the plate 37 also assist in restraining the stator against movement in the counterclockwise direction.

The nut is thereby turned down rapidly until it encounters substantial resistance upon engagement with a block or other piece of work W. Rotation of the wrench is then suddenly decelerated, and through the clutch this deceleration is transmitted to the rotor. Fluid pressure on the intake side of the rotor thereupon builds up behind the exposed ends of the blades 27 and the stator, which is rotatably supported as previously described, rotates counter-clockwise in response to this back pressure an extent of about 30°, the extent of its rotation being checked by one of the pins 43 active on one of the plungers 45 for compressing the component spring 46 as shown in Fig. 9. Due to the upper ends of the levers 57 located in the notches 38 of the stator plate 37, rotation of the stator will cause tilting of the levers 57 on their pivots 58 and throwing up one roller 56 of each lever to the position illustrated in Fig. 13. These rollers, acting upon the rim 55 of the clutch element 53, slide that element upwardly against the action of spring 54 from the position of Fig. 1 to that of Fig. 2. The rotor then being freed immediately resumes rotation in the clockwise direction and the upper or driving element of the clutch begins to ride over the lower or driven element as illustrated in Fig. 11 and previously explained. Back pressure on the stator is thereby also relieved, causing the compressed spring 46 to promptly expand and return the stator to normal position, thereby moving the levers 57 back to normal position as shown in Fig. 12.

The jaw 64 of the driving clutch element, continuing to ride over the land 62 of the driven clutch element, after more than 180° of such movement clears the edge 60' of the jaw 60, and the spring 54 slides the driving clutch element down so that the jaws of the two elements are in the same plane. During this independent rotation of the driving clutch element the rotor gains momentum and, by the time the clutch again engages, the rotor has accelerated to a high speed. The engagement therefore takes place with a comparatively heavy shock or hammer blow which is communicated to the socket wrench and results in imparting a relatively strong short impulse to turn the nut. This all occurs, of course, in a very short space of time. When the engagement takes place and the hammer blow is delivered, the driving clutch element is stopped abruptly; in other words, its deceleration is extremely rapid. The rotor is thereby stopped suddenly and back pressure is exerted on the stator in the same manner as previously described, and the clutch is disengaged and reengaged to deliver another hammer blow. These cycles follow each other in rapid succession and are continued until the operator by experience knows that the nut has been driven home as tightly as desired, whereupon he permits the throttle lever to close and removes the tool from the nut.

In case it is desired to use the tool for removing nuts from bolts the operator turns reversing valve 16 from the position of Figs. 1 and 2 to that of Fig. 3, whereupon passages 17', 20', 34', 33', 32' and 36' become inlet passages and the former inlet passages 17, 20, 34, 33, 32, 36 become exhaust passages. The disengagement and reengagement of the clutch occurs in the same manner as before, since all of the operating parts are double-acting and function exactly the same regardless of the direction of rotation. However, in running the tool in such reverse direction the intermittent impulses occur at the start of the operation and after the nut is sufficiently loosened the rotor may turn continuously instead of intermittently.

Variations from the described structure may be employed. Accordingly I desire it to be understood that the scope of the invention is to be regarded as defined exclusively by the appended claims rather than by the foregoing description or the accompanying illustrations.

Having thus described my invention, I claim:

1. In a power tool of the class described, a rotor, a driven head, a two-jaw clutch between the rotor and the head capable of release and of subsequent reengagement, said clutch comprising a pair of clutch elements having teeth on opposed faces thereof adapted for engagement, one of the clutch elements having a rotational bearing surface one side thereof of a height equal to that of its teeth, said surface being engageable by a tooth of the other clutch element for holding said clutch elements out of engaging relation for more than 180° of rotor movement following the release of said clutch, and means for causing the automatic reengagement of the clutch elements at the end of a full rotation of the rotor.

2. In a power tool of the class described, a driving spindle, a driven head, a releasable clutch between said spindle and head including a pair of circular clutch elements, a duality of diametrically opposed teeth on the opposed faces of said clutch elements, said teeth extending radially inward from the outer periphery of said faces, means leading from one to the other tooth on one side of one clutch element engageable by a tooth of the other clutch element for holding said clutch in released condition for more than 180° of spindle movement following the release of said clutch, and means for causing the automatic reengagement of the clutch at the end of a full rotation of the spindle.

3. In a power tool of the class described, a driving spindle, a driven head, a releasable clutch between said spindle and head including a pair of circular clutch elements, a duality of diametrically opposed teeth on the opposed faces of said clutch elements, said teeth extending radially inward from the outer periphery of said faces, a partly circular land uniting the inner ends of the teeth of one clutch element on one side of the diametric axis of the teeth thereof, one tooth of the other element being radially longer than the other one for engagement with said land to hold said clutch in released condition for more than 180° of spindle movement following the release of the clutch, and means for causing the automatic reengagement of the clutch at the end of a full rotation of the spindle.

4. In a power tool of the class described, a tool body, a rotor, a driven head, a clutch between the rotor and the head including a pair of circular clutch elements, a stator rotatably supported coaxially with the rotor, said stator including a plate secured at its lower end and having diametrically opposed notches formed therein, a lever pivotally supported in the body having an arm in engagement with one of said notches and another arm running upon one element of the clutch and adapted to shift said element axially for disengagement of the clutch in response to the reaction to the stator upon the sudden deceleration of the head, means for returning the stator and lever to normal position, and means adapted to shift said axially movable clutch element back to clutch engaging position after a predetermined further rotation of the rotor.

5. In a power tool of the class described, a tool body, a rotor, a driven head, a clutch between the rotor and the head, a stator rotatably supported coaxially with the rotor, said stator including a plate secured at its lower end and having diametrically opposed notches formed therein, a partition fixedly secured to said body and disposed between said plate and clutch, spring pressed plungers mounted in said partition, means carried by said plate having engagement with said plungers for limiting movement of said stator upon the sudden deceleration of the head, means carried by said body having engagement with one of said notches and said clutch and responsive to the reaction of the stator for disengaging the clutch, and means adapted to reengage the clutch automatically after a predetermined further rotation of the rotor.

6. In a power tool of the class described, a tool body, a rotor, a driven head, a clutch between the rotor and the head including a pair of circular clutch elements, a stator rotatably supported coaxially with the rotor, said stator including a plate secured at its lower end and having diametrically opposed notches formed therein, a partition fixedly secured to said body and disposed between said plate and clutch, spring pressed plungers mounted in said partition, pins depending from said plate for engagement with said plungers adapted to limit movement of said stator upon the sudden deceleration of the head, a lever pivotally supported in the body having an arm extending through said partition in engagement with one of said notches and another arm running upon one element of the clutch and adapted to shift said element axially for disengagement of the clutch in response to the reaction of the stator, and means adapted to shift said axially movable clutch element back to clutch engaging position after a predetermined further rotation of the rotor.

PAUL VAN SITTERT.